United States Patent
Ueno

(10) Patent No.: US 8,151,320 B2
(45) Date of Patent: Apr. 3, 2012

(54) REMOTE ACCESS SYSTEM, METHOD AND PROGRAM

(75) Inventor: Hiroshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 422 days.

(21) Appl. No.: 12/394,494

(22) Filed: Feb. 27, 2009

(65) Prior Publication Data

US 2009/0222892 A1    Sep. 3, 2009

(30) Foreign Application Priority Data

Feb. 29, 2008    (JP) ................... 2008-050173

(51) Int. Cl.
G06F 21/00    (2006.01)

(52) U.S. Cl. ............................. 726/3; 726/23

(58) Field of Classification Search ............... 726/9, 26, 726/27, 28, 29; 713/224, 201, 212, 213, 713/220, 223; 709/204, 201, 220, 227; 707/600, 707/607, 608, 609, 687, 821; 380/200, 201, 380/202, 293, 227
See application file for complete search history.

(56) References Cited

U.S. PATENT DOCUMENTS

| | | | |
|---|---|---|---|
| 6,496,935 | B1 | 12/2002 | Fink et al. |
| 2007/0180526 | A1* | 8/2007 | Copeland, III ................ 726/23 |
| 2010/0191829 | A1* | 7/2010 | Cagenius ...................... 709/219 |

FOREIGN PATENT DOCUMENTS

JP    2003-525557    8/2003

* cited by examiner

*Primary Examiner* — Vivek Srivastava
*Assistant Examiner* — Nega Woldemariam
(74) *Attorney, Agent, or Firm* — Young & Thompson

(57) ABSTRACT

A remote access system comprises a remote terminal, an access server accommodating a connection from the remote terminal, and first and second logical channels logically connecting the remote terminal and the access server. The remote terminal comprises a flow search processing unit that classifies flows. The access server comprises a pass determining unit that determines whether a flow can pass or not, and a flow search processing unit that classifies flows. The first logical channel is used to transfer packets included in a flow that needs to be judged by the access server as to whether it can pass or not. The second logical channel is used to transfer packets included in a flow that has been permitted by the access server to pass.

14 Claims, 11 Drawing Sheets

FIG. 6

| SOURCE IP (REMOTE TERMINAL), DESTINATION IP, PROTOCOL, PORT NUMBER (DESTINATION, SOURCE) | {PASS (VPN 12), OTHER (VPN11)} | EXPIRATION TIME |
|---|---|---|

FLOW TABLE ENTRY EXAMPLE (REMOTE TERMINAL)

| SOURCE IP, DESTINATION IP (REMOTE TERMINAL), PROTOCOL, PORT NUMBER (DESTINATION, SOURCE) | {PASS (VPN 12), OTHER (VPN11)} | EXPIRATION TIME |
|---|---|---|

FLOW TABLE ENTRY EXAMPLE (VPN ACCESS SERVER)

FIG. 9

POLICY TABLE

| priority | IPSA | IPDA | protocol | dport | sport | action |
|---|---|---|---|---|---|---|
| 10 | 10.1.1.100/32 | 10.1.3.0/24 | TCP | 80 | any | allow |
| 15 | 10.1.1.0/24 | 10.1.3.0/24 | TCP | 80 | any | deny |
| 20 | 10.1.1.0/24 | 10.1.0.0/16 | TCP | any | any | allow |
|  |  |  |  |  |  |  |

FLOW TABLE

| REMOTE TERMINAL | HOST | | | | | |
|---|---|---|---|---|---|---|
| IPSA | IPDA | protocol | dport | sport | OUTPUT | EXPIRATION TIME |
| 10.1.1.100 | 10.1.3.1 | TCP | 80 | 1234 | VPN12 | 0:15 |

REMOTE ACCESS SYSTEM, METHOD AND PROGRAM

REFERENCE TO RELATED APPLICATION

This application is based upon and claims the benefit of the priority of Japanese patent application No. 2008-050173 filed on Feb. 29, 2008, the disclosure of which is incorporated herein in its entirety by reference thereto.

FIELD OF THE INVENTION

The present invention relates to a remote access system, method and program, and particularly to a remote access system, method and program that perform access control when a remote terminal requests access to a private network via a VPN (Virtual Private Network) connection using a public network.

BACKGROUND ART

Patent Document 1 shows an example of a conventional firewall processing. In such a conventional technology, a pre-filtering module is provided to ease the burden on the firewall. The pre-filtering module performs a limited set of actions with regard to packets, according to whether the packets are received from a connection which has been previously permitted by the firewall. If the packets are received from such a permitted connection, then the pre-filtering module forwards the packets to their destination, optionally performing one or more actions on the packets. Otherwise, the packets are forwarded to the firewall for handling. Once the firewall has transferred responsibility of the pre-filtering module for the connection, or "off-loaded" the connection, the firewall does not receive further packets from this connection, i.e., the connection is closed, until a timeout occurs for the connection, or a packet is received with a particular session-control field value indicating that the session is finished.

An example of access control in the conventional VPN connection will be described. FIG. 10 is a block diagram showing the configuration of an example of the conventional remote access system. By the provision of the firewall, the access of traffic is limited, which accesses to a LAN 20 from remote terminals via a VPN access server 410, to a particular server 300. Such a system (FIG. 10) can be configured by combining general VPN access means and a commercial firewall device. In FIG. 10, a filter device 500 corresponds to the firewall device. The firewall device 500 refers to policies using its firewall function and determines whether traffic is permitted to pass or not. For instance, a configuration disclosed in Patent Document 1 may be employed as the filter device 500.

[Patent Document 1] Japanese Patent Kohyo Publication No. JP-P2003-525557A

SUMMARY

The following analysis has been made by the present inventor. Problems in the configuration of the remote access system in FIG. 10 will be described. Referring to FIG. 10, the filter device 500 is provided at a spot where access from VPN remote terminals 400-1 to 400-N is concentrated. As a result, the burden of reference processing imposed on the filter device 500 that refers to a policy table in access control increases accompanied by lowering in access performance. The method disclosed in Patent Document 1 is effective in improving the performance of the filter processing, however, the fact that the filter processing is concentrated on one spot creates problems. For example, when the number of the VPN remote terminals 400-1 to 400-N is increased, or a great amount of access traffic is concentrated, the system is not scalable to handle the increased amount of traffic. Therefore, access control scalable against the number of VPN access requests is desirable.

On the other hand, if the filter function is assigned to each of the VPN remote terminals 400-1 to 400-N, the processing burden of the access server will be eased since the filter processing will not be concentrated on one spot. However, since the VPN remote terminals 400-1 to 400-N may rewrite the policy at their will without obtaining permission and transmit traffic, ignoring the policy setting set by the administrator, this configuration is not desirable from security standpoint.

Thus, it is an object of the present invention to provide a remote access system, method, and program whose performance does not suffer from lowering, while maintaining security, even when the number of access terminals accommodated increases. More particularly, it is an object of the present invention to provide a remote access system, method, and program capable of performing access control over VPN access traffic to a LAN, while maintaining security, without sacrificing performance even when the number of access terminals accommodated increases.

According to a first aspect, there is provided a remote access system comprising a remote terminal, an access server that accommodates a connection from the remote terminal, and first and second logical channels that connect the remote terminal and the access server. The remote terminal comprises a flow search processing unit that classifies flows; the access server comprises a pass determining unit that determines whether or not a flow is permitted to pass and a flow search processing unit that classifies flows. The first logical channel is used to transfer packets included in a flow that needs to be judged by the access server as to whether or not the flow can pass; and the second logical channel is used to transfer packets included in a flow that has been permitted by the access server to pass.

In a first mode of the remote access system, it is preferable that the flow search processing unit in the remote terminal classify a flow; transmit packets included in a flow that needs to be judged by the access server as to whether or not the flow can pass to the access server via the first logical channel; and transmit packets included in a flow that has been permitted by the access server to pass to the access server via the second logical channel.

In a second mode of the remote access system, it is preferable that the access server permit packets received via the second logical channel to pass without determining whether or not they are allowed to pass; and the pass determining unit in the access server is configured so as to determine whether or not packets received via the first logical channel are permitted to pass and register information of the flow, to which the packets belong, to the flow search processing unit in the access server when the packets are permitted to pass.

In a third mode of the remote access system, it is preferable that the flow search processing unit in the access server classify a flow to which packets that must be transmitted to the remote terminal belong; transmit the packets belonging to the flow to the remote terminal via the second logical channel when it is not necessary to determine whether or not the flow is permitted to pass; and transmit the packets to the remote terminal via the first logical channel after the pass determining unit determines whether or not the flow is permitted to pass when it is necessary to determine whether or not the flow is permitted to pass.

In a fourth mode of the remote access system, it is preferable that flow information referred to by the flow search processing unit in the remote terminal be automatically registered to a flow table provided in the remote terminal based on information of a flow to which packets received via the second logical channel belong.

In a fifth mode of the remote access system, it is preferable that flow information referred to by the flow search processing unit in the access server be registered to a flow table provided in the access server when the pass determining unit permits a flow to pass.

According to a second aspect, there is provided a remote terminal which has its connection accommodated by an access server and is connectable to the access server by first and second logical channels. The remote terminal comprises a flow search processing unit that classifies flows, transmits packets included in a flow that needs to be judged by the access server as to whether or not the flow can pass to the access server via the first logical channel, and transmits packets included in a flow that has been permitted by the access server to pass to the access server via the second logical channel.

According to a third aspect, there is provided an access server which accommodates a connection from a remote terminal and is connectable to the remote terminal by first and second logical channels. The access server comprises: a pass determining unit that determines whether or not a flow is permitted to pass and a flow search processing unit that classifies flows, transmits packets included in a flow that needs to be judged by the access server as to whether or not the flow can pass to the remote terminal via the first logical channel, and transmits packets included in a flow that has been permitted by the access server to pass to the remote terminal via the second logical channel.

According to a fourth aspect, there is provided a remote access method which enables a remote terminal and an access server that accommodates a connection from the remote terminal to remotely access each other. The method comprises: having a remote terminal classify a flow; having the remote terminal transmit packets included in a flow that needs to be judged by the access server as to whether or not the flow can pass to the access server via a first logical channel and transmit packets included in a flow that has been permitted by the access server to pass to the access server via a second logical channel; and having the access server permit packets received via the second logical channel to pass without determining whether or not they are allowed to pass.

According to a fifth aspect, there is provided a remote access method which enables a remote terminal to remotely access an access server. The method comprises: classifying a flow; and transmitting packets included in a flow that needs to be judged by the access server as to whether or not the flow can pass to the access server via a first logical channel and transmitting packets included in a flow that has been permitted by the access server to pass to the access server via a second logical channel.

According to a sixth aspect, there is provided a remote access method which enables an access server to remotely access a remote terminal. The method comprises: permitting packets, received via a logical channel exclusively for transferring packets included in a flow that has been permitted by the access server to pass, to pass without determining whether or not they are allowed to pass.

According to a seventh aspect, there is provided a remote access program which has computers provided in a remote terminal and an access server that accommodates a connection from the remote terminal execute remote access processing that enables the remote terminal and the access server to remotely access each other. The remote access program causes the computer provided in the remote terminal to classify a flow, to transmit packets included in a flow that needs to be judged by the access server as to whether the flow can pass or not to the access server via a first logical channel, and to transmit packets included in a flow that has been permitted by the access server to pass to the access server via a second logical channel. And the program further causes has the computer provided in the access server to permit packets received via the second logical channel to pass without determining whether or not they are allowed to pass.

According to an eighth aspect, there is provided a remote access program which has a computer provided in a remote terminal execute remote access processing that enables the remote terminal to remotely access an access server. The remote access program causes the computer provided in the remote terminal to classify a flow, to transmit packets included in a flow that needs to be judged by the access server as to whether or not the flow can pass to the access server via a first logical channel, and to transmit packets included in a flow that has been permitted by the access server to pass to the access server via a second logical channel.

According to a ninth aspect, there is provided a remote access program which has a computer provided in an access server execute remote access processing that enables the access server to remotely access a remote terminal. The remote access program causes the computer provided in the access server to permit packets, received via a logical channel exclusively for transferring packets included in a flow that has been permitted by the access server to pass, to pass without determining whether or not they are allowed to pass.

Meritorious effects of the present invention are summarized as follows, however, without limiting purpose.

According to the present invention, a remote access system, method, and program whose performance does not suffer from lowering, while maintaining security, even when the number of access terminals accommodated increases can be provided. The remote access system comprises a remote terminal and an access server that performs filter processing on flows received from the remote terminal, and when a flow received from the remote terminal is permitted by the access server to pass, the remote terminal and the access server share the burden of the filter processing on the flow permitted.

BRIEF DESCRIPTION OF THE DRAWINGS

FIG. 6 is a drawing showing the format of flow tables provided in the VPN remote terminal and the VPN access server relating to an exemplary embodiment.

FIG. 9 is a drawing showing a policy table in an example.

PREFERRED MODES

Exemplary Embodiment 1

Figure 1:
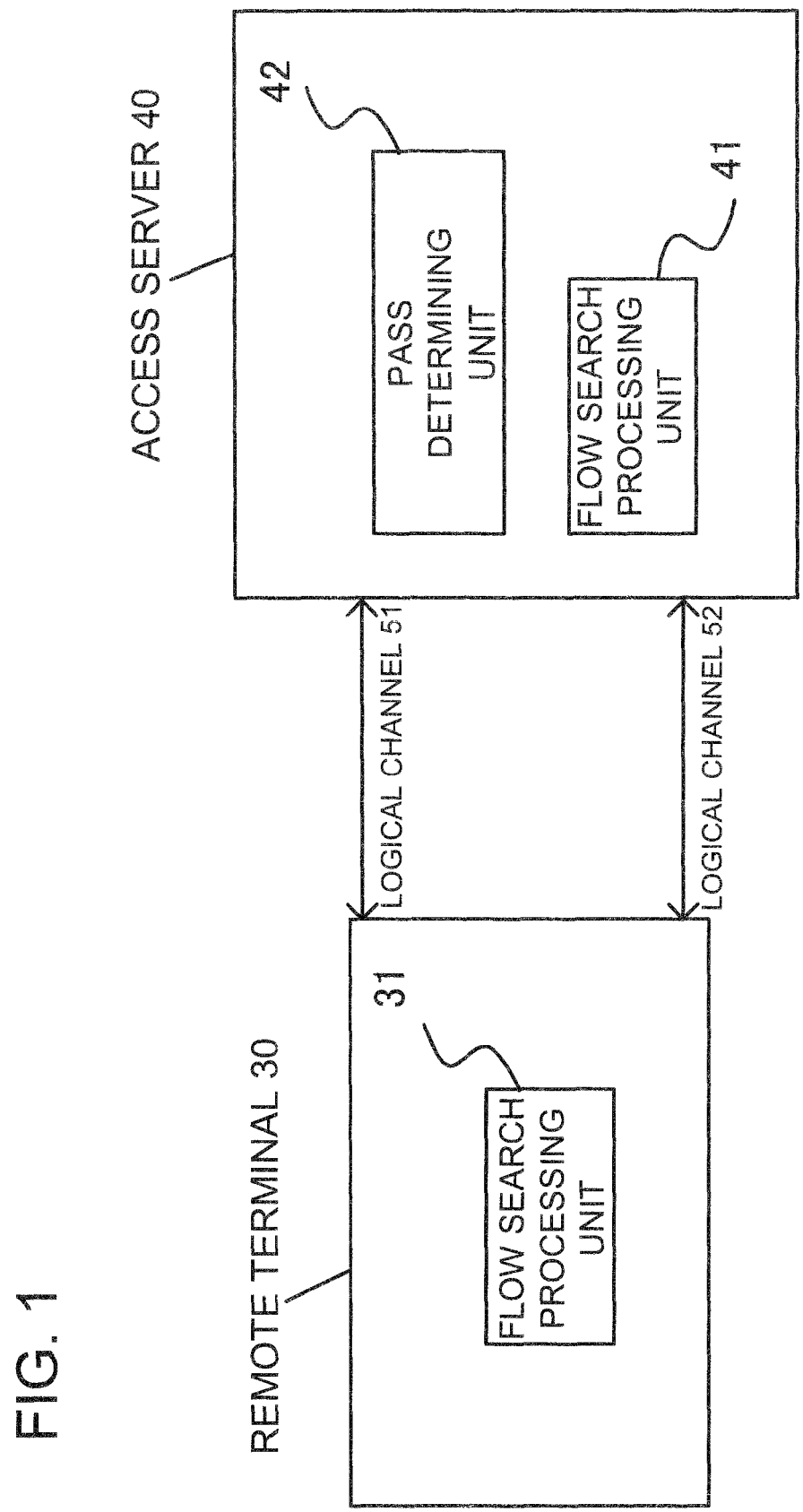
FIG. 1 is a block diagram showing the configuration of a remote access system relating to an exemplary embodiment.

A remote access system relating to a first exemplary embodiment will be described with reference to the drawings. FIG. 1 is a block diagram showing the configuration of the remote access system relating to the present exemplary embodiment.

Referring to FIG. 1, the remote access system comprises a remote terminal 30, an access server 40 accommodating a connection from the remote terminal 30, and first and second logical channels 51 and 52 connecting the remote terminal 30 and the access server 40. The remote terminal 30 comprises a flow search processing unit 31 that classifies flows. The access server 40 comprises a pass determining unit 42 that determines whether a flow can pass or not, and a flow search processing unit 41 that classifies flows. The first logical channel 51 is used to transfer packets included in a flow that needs to be judged by the access server 40 as to whether it can pass or not. The second logical channel 52 is used to transfer packets included in a flow that has been permitted by the access server 40 to pass.

Preferably, the flow search processing unit 31 in the remote terminal 30 classifies the flows; transmits the packets included in a flow that needs to be judged by the access server 40 as to whether or not it can pass to the access server 40 via the first logical channel 51; and transmits the packets included in a flow that has been permitted by the access server 40 to pass to the access server 40 via the second logical channel 52.

Preferably, the access server 40 permits the packets received via the second logical channel 52 to pass without determining whether or not they are allowed to pass; and the pass determining unit 42 determines whether or not the packets received via the first logical channel 51 are permitted to pass and registers the information of the flow, to which the packets belong, to the flow search processing unit 41 when the packets are permitted to pass.

Preferably, the flow search processing unit 41 in the access server 40 classifies a flow to which the packets that must be transmitted to the remote terminal 30 belong; transmits the packets belonging to the flow to the remote terminal 30 via the second logical channel 52 when it is not necessary to determine whether or not the flow is permitted to pass; and transmits the packets to the remote terminal 30 via the first logical channel 51 after the pass determining unit 42 determines whether or not the flow is permitted to pass when it is necessary to determine whether or not the flow is permitted to pass.

Preferably, flow information referred to by the flow search processing unit 31 in the remote terminal 30 is automatically registered to a flow table provided in the remote terminal 30 based on information of a flow to which packets received via the second logical channel 52 belong.

Preferably, flow information referred to by the flow search processing unit 41 in the access server 40 is registered to a flow table provided in the access server 40 when the pass determining unit 42 permits a flow to pass.

Figure 11:
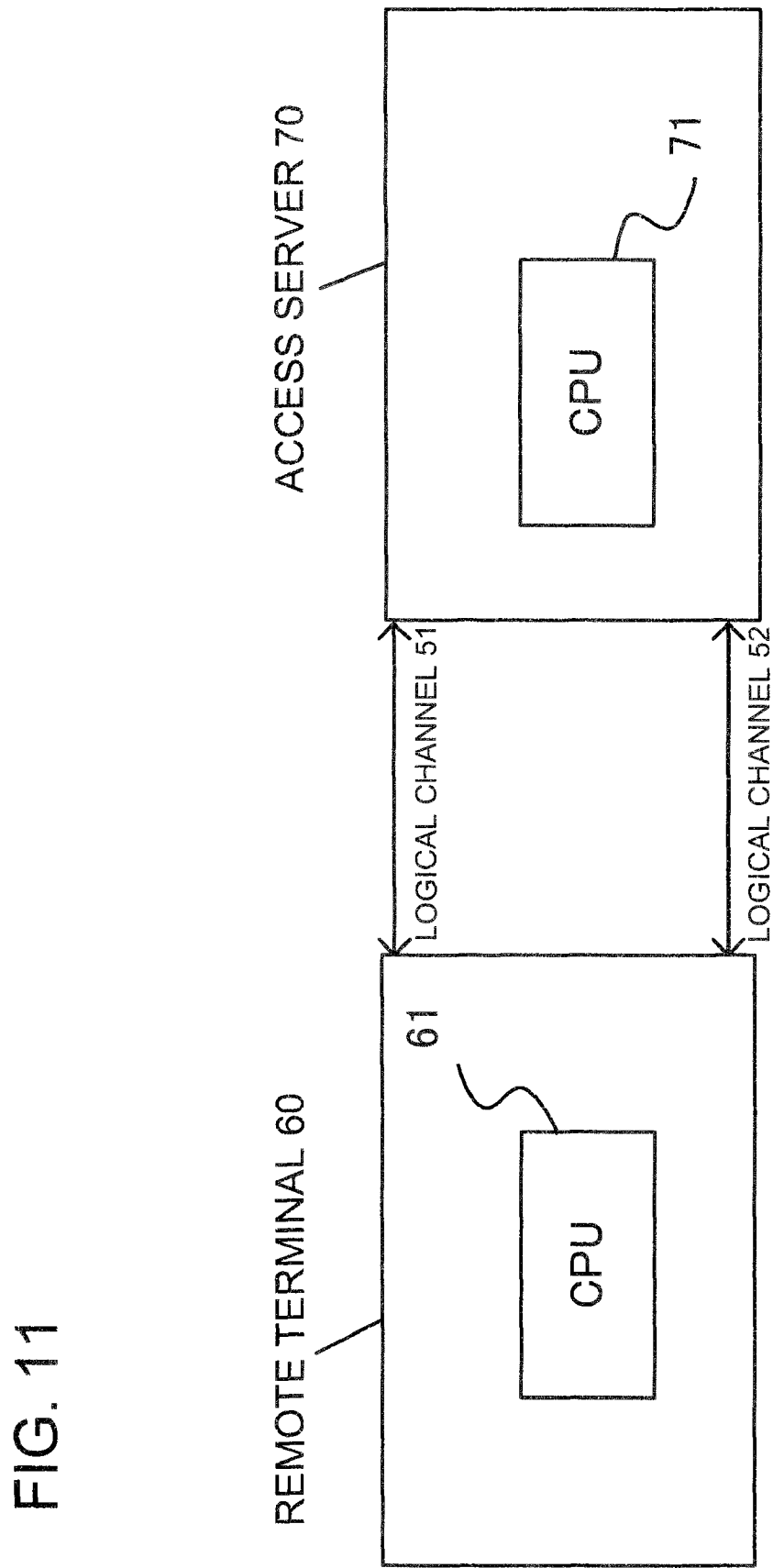
FIG. 11 is a block diagram showing the configuration of a remote access system relating to an exemplary embodiment.

Further, the processing of each unit in the remote access system relating to the present exemplary embodiment described above may be executed by a computer using a remote access program. FIG. 11 is a configuration diagram of a remote system in this scenario. Referring to FIG. 11, the remote access program has CPUs 61 and 71 provided in a remote terminal 60 and an access server 70 execute the remote access processing in the remote access system comprising the remote terminal 60, the access server 70 accommodating a connection from the remote terminal 60, and the first and second logical channels 51 and 52 connecting the remote terminal 60 and the access server 70. The remote access program has the CPU 61 provided in the remote terminal 60 execute the processing that classifies flows in the remote terminal 60. Further, in the remote terminal 60, the remote access program has the CPU 61 provided in the remote terminal 60 execute the processing that transmits the packets included in a flow, which needs to be judged by the access server 70 as to whether or not it is permitted to pass, to the access server 70 via the first logical channel, and that transmits the packets included in a flow, which has been permitted to pass by the access server 70, to the access server 70 via the second logical channel 52. Further, in the access server 70, the remote access program has the CPU 71 provided in the access server 70 execute the processing that permits the packets received via the second logical channel 52 to pass without determining whether they are permitted to pass or not.

Exemplary Embodiment 2

Figure 2:
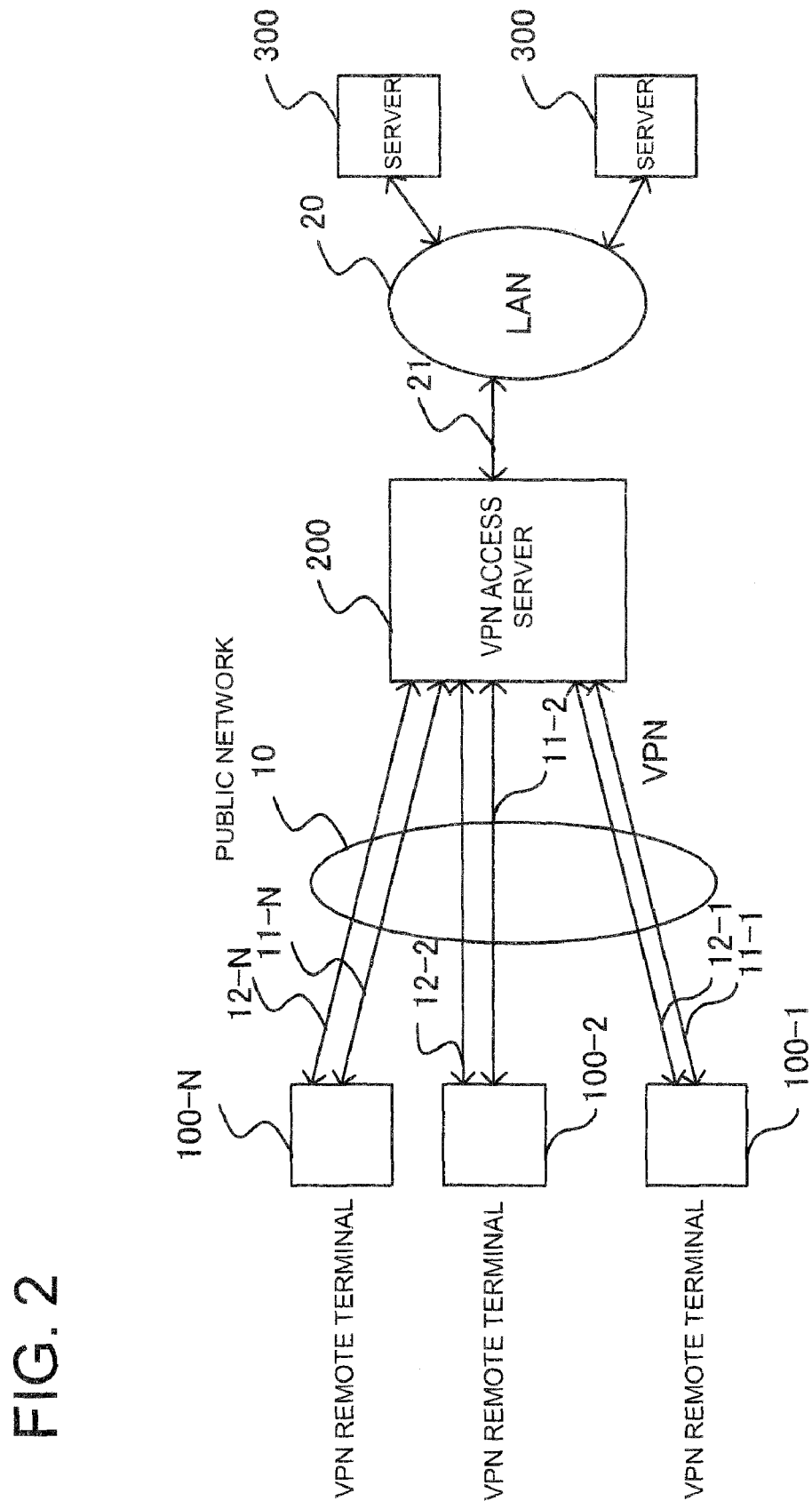
FIG. 2 is a block diagram showing the configuration of a remote access system relating to an exemplary embodiment.

A remote access system relating to a second exemplary embodiment of the present invention will be described with reference to the drawings. The present exemplary embodiment relates to a remote access using a VPN. FIG. 2 is a block diagram showing the configuration of the remote access system of the present exemplary embodiment. The remote access system comprises VPN remote terminals 100-1 to 100-N and a VPN access server 200, connected to each other via a public network 10.

An access control unit provided in the VPN access server 200 determines whether or not a flow is permitted to pass, and register the information of a flow that has been permitted to pass to flow tables provided in the VPN remote terminals 100-*i* (i=1 to N) and the VPN access server 200. By transferring flows that have been permitted to pass via a VPN 12-*i*, based on the fact that the flows have been permitted to pass, the VPN remote terminals 100-*i* and the VPN access server 200 collaborate on the processing that determines whether or not flows are permitted to pass.

A flow that has been permitted by the VPN access server 200 to pass is transferred to the VPN access server 200 using the VPN 12-*i* according to flow entries in the VPN remote terminals 100-*i*. Meanwhile, when the VPN access server 200 receives traffic from the VPN 12-*i*, the VPN access server 200 assumes that the traffic has already been permitted to pass and skips the processing that determines whether or not it is permitted to pass. On the other hand, when the VPN access server 200 receives traffic from a LAN 20, the VPN access server 200 checks whether or not the flow has already been permitted to pass, and if it has been permitted, the VPN access server 200 transfers the flow to the VPN remote terminals 100-*i* using the VPN 12-*i* notifying that the flow has already been permitted. As described above, the number of the processing that refers to a policy table in the VPN access server 200 (the processing that determines whether a flow is permitted to pass) is reduced, and the processing burden (load) of the VPN access server 200 is eased by dividing the tasks of the processing that determines whether or not a flow is permitted to pass between flow search processing units respectively provided in the VPN remote terminals 100-$i$ and the VPN access server 200.

According to the present exemplary embodiment, since the determining processing by referring to the policy table is performed only on first several packets in the processing by the VPN access server 200 that determines whether or not a flow is permitted to pass and the flows that have already been permitted are transferred after references is made to the flow tables provided in the VPN remote terminals 100-1 to 100-N and the VPN access server 200, the processing burden required for searching the policy table in the VPN access server 200 can be reduced and the access performance does not suffer from lowering even when access processings are concentrated.

Exemplary Embodiment 3

Next, a third exemplary embodiment of the present invention will be described in detail with reference to the drawings. FIG. 2 shows the configuration of a VPN remote access system relating to the present exemplary embodiment. The VPN access server 200 is connected to the LAN 20 and the public network 10. The VPN access server 200 establishes VPN 11-1 to 11-N and VPN 12-1 to 12-N between itself and the VPN remote terminals 100-1 to 100-N via the public network 10 (including the Internet). The VPN remote terminals 100-1 to 100-N are able to use a service offered by a server 300 connected to the LAN 20 via this VPN. Note that N represents the number of the remote terminals and N can be any number (positive integer) in the present exemplary embodiment.

Figure 3:
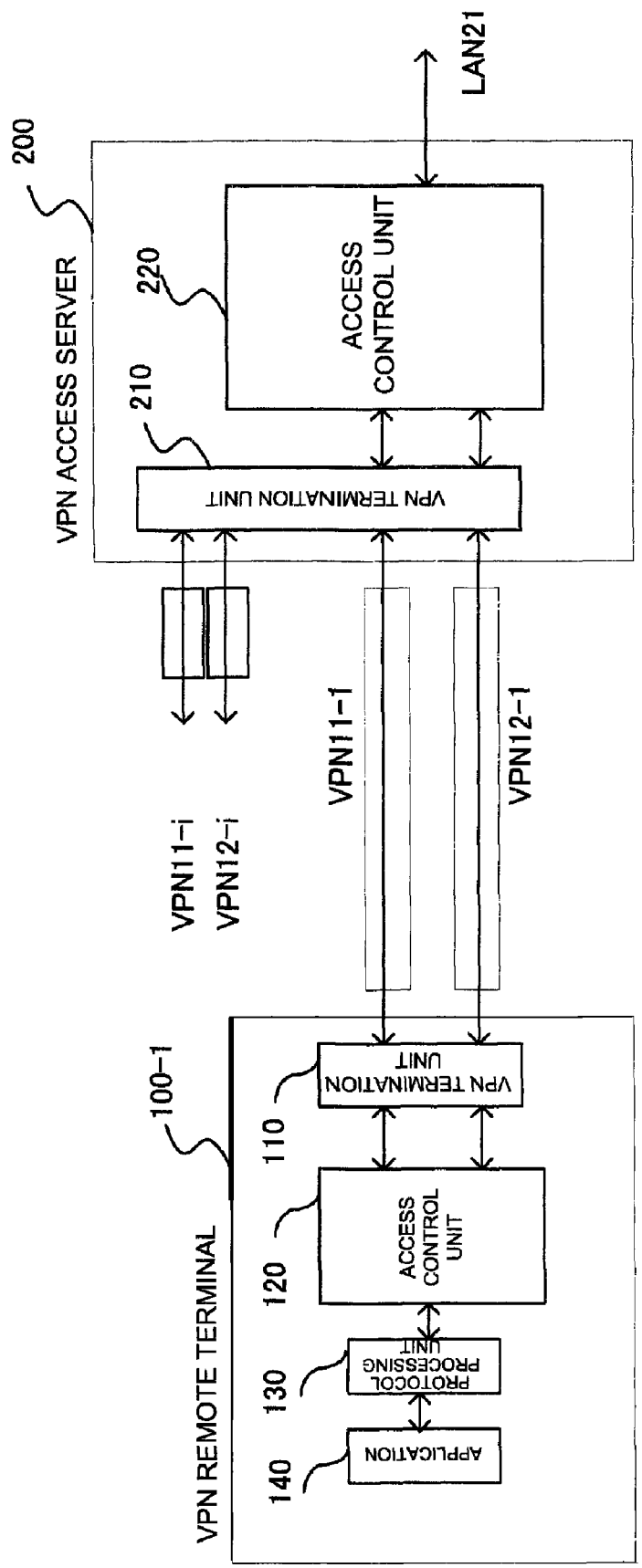
FIG. 3 is a block diagram showing the detailed configuration of a remote access system relating to an exemplary embodiment.

FIG. 3 shows the configurations of the VPN remote terminal 100 and the VPN access server 200 in the present exemplary embodiment. The VPN remote terminal 100 comprises a VPN termination unit 110, an access control unit 120, a protocol processing unit 130, and an application 140. The VPN access server 200 comprises a VPN termination unit 210 and an access control unit 220. The VPN remote terminal 100-1 and the VPN access server 200 are connected via the VPNs 11-1 and 12-1. Further, the VPN access server 200 is connected to the other VPN remote terminals 100-$i$ ($i$=2 to N) via the VPNs 11-$i$ and 12-$i$. Further, the VPN access server 200 is connected to the LAN 20 by a LAN 21.

Figure 4:
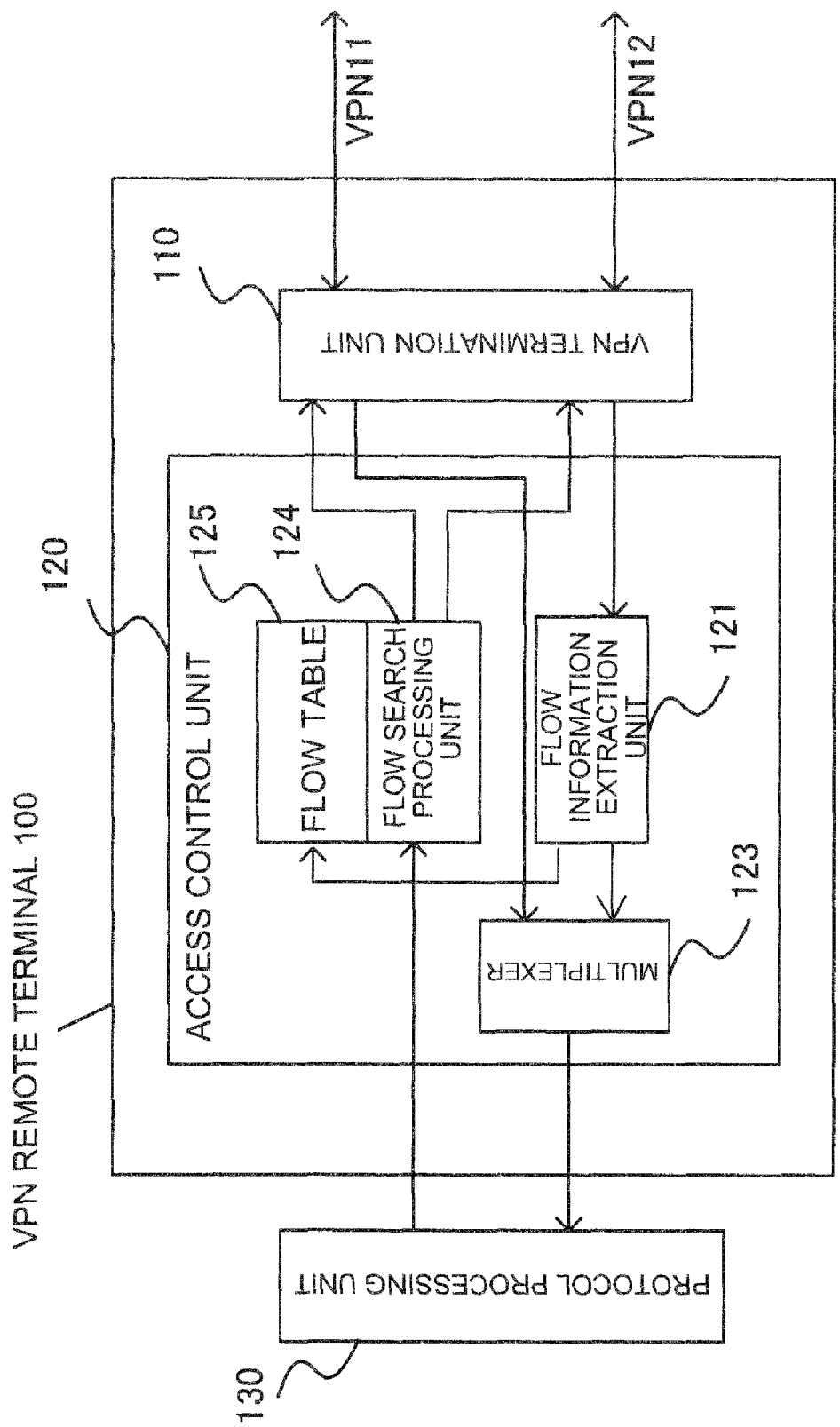
FIG. 4 is a block diagram showing the configuration of a VPN remote terminal relating to an exemplary embodiment.

FIG. 4 is a block diagram showing the configuration of the VPN remote terminal 100 of the present exemplary embodiment. The access control unit 120 comprises a flow information extraction unit 121, a multiplexing unit 123, a flow search processing unit 124, and a flow table 125. The access control unit 120 is connected to two VPNs 11 and 12 terminated by the VPN termination unit 11.

The flow information extraction unit 121 extracts flow information from the VPN 12 and registers it to the flow table 125. The flow search processing unit 124 refers to the flow table 125, searches for data that the flow search processing unit 124 is receiving from the protocol processing unit 130, and determines whether the data should be sent to the VPN 11 or the VPN 12. The multiplexing unit 123 multiplexes output data from the flow information extraction unit 121 and data received from the VPN 11, and outputs the result to the protocol processing unit 130.

Figure 5:
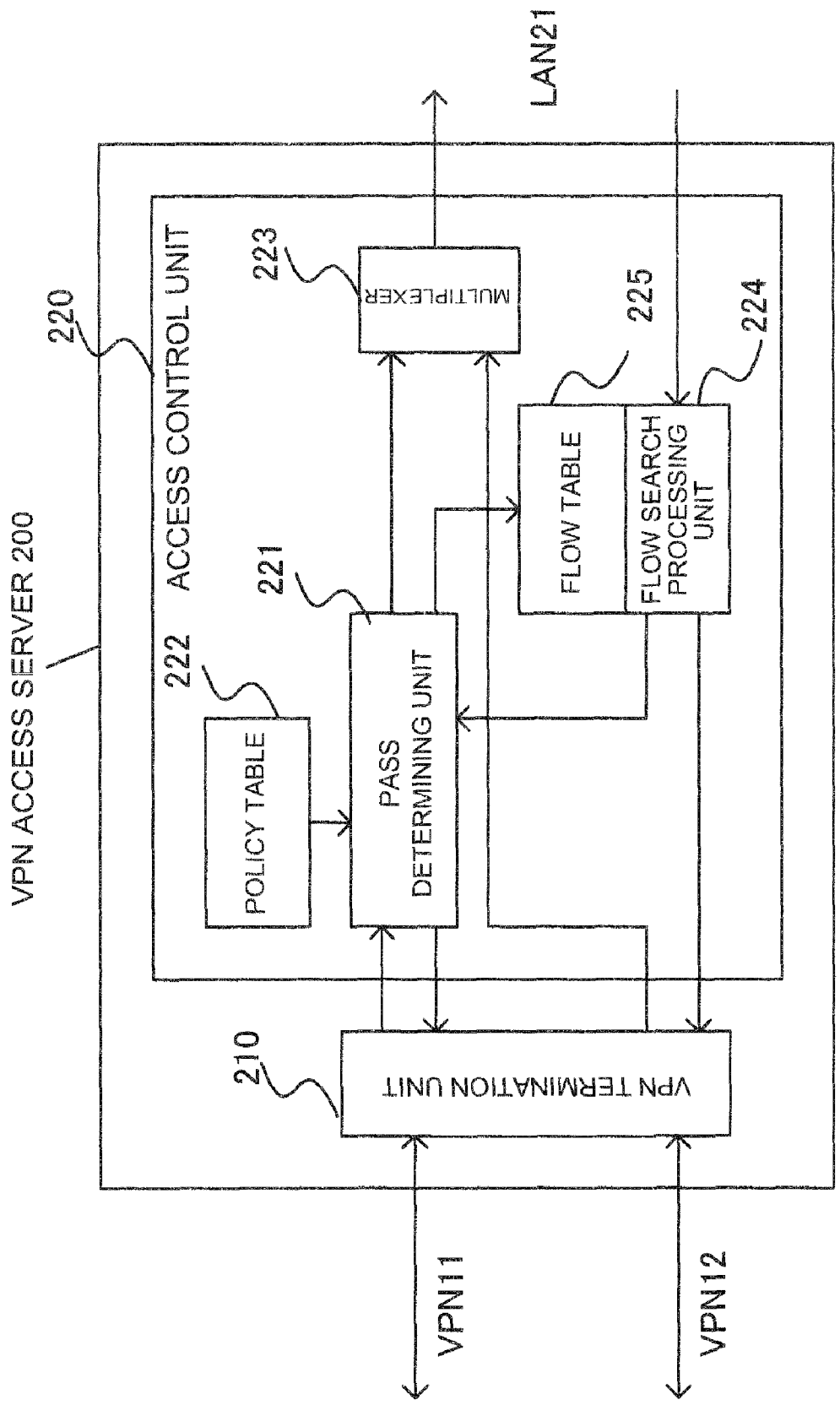
FIG. 5 is a block diagram showing the configuration of a VPN access server relating to an exemplary embodiment.

FIG. 5 shows the configuration of the access control unit 220 in the VPN access server 200 in the present exemplary embodiment. The access control unit 220 comprises a pass determining unit 221, a policy table 222, a multiplexer 223, a flow search processing unit 224, and a flow table 225.

The pass determining unit 221 receives data from the VPN 11 and determines whether or not the data are permitted to pass according to the policy table 222. This is determined based on the information of the packet header (IP, TCP, UDP, etc.). When it is determined that the flow is permitted to pass and access control tasks over the flow are shared with the remote terminal 100, the flow information is registered to the flow table 225. The multiplexer 223 multiplexes an output of the pass determining unit 221 and data received from the VPN 12, and outputs the result to the LAN 21. The flow search processing unit 224 performs a flow search based on the header of data received from the LAN 21. The flow search is performed referring to the flow table 225. As a result of the search, when it is determined that access control tasks are shared with the remote terminal 100, the received data are transmitted to the VPN 12, and when it is determined that the pass determining unit 221 should refer to the packets or that access control tasks are not shared with the remote terminal 100, the received data are transmitted to the VPN 11.

FIG. 6 shows examples of entries in the flow tables 125 and 225. For instance, the flow table 125 in the remote terminal 100 stores a source IP address indicating the IP address of the remote terminal 100, a destination IP address indicating the IP address of the destination, a layer 4 protocol type, and a layer 4 destination and source port number as key fields, and indicates whether the destination is the VPN 12 or the VPN 11 as a corresponding action. Further, an expiration time field records time information (a time variable) indicating the expiration time of the entry.

The contents of the flow table 225 in the VPN access server 200 are nearly identical. Since searches are performed on traffic on the LAN side, the destination IP address indicates the IP address of the remote terminal 100; the source IP address is the IP address of the server 300, which is the source of the traffic; the layer 4 source port number is the port number of the server 300; and the destination port number is a port number assigned by the remote terminal 100. Further, information indicating whether or not the data is transferred to (or via) the VPN 12 or 11 in an output action is stored and the expiration time is also recorded.

Further, the functions of the VPN remote terminal 100 and the VPN access server 200 may be realized as a program (software) operating on a CPU or as a hardware circuit. The program may be stored on a recording device or medium of any type, internally or externally of the CPU.

In the present exemplary embodiment, two channels (the VPN 11 and the VPN 12) are used (shown), however, these channels do not have to be physically different lines, as long as they constitute a plurality of logically identifiable channels. For instance, two types of VLAN (Virtual local Area Network) circuits multiplexed on a single VPN established by using IPSec or SSL-VPN or a MPLS (Multiprotocol Label Switching) channel may be used. Or the identification can be made by using an additional information bit of the IP header called TOS field. Two logical channels can be established between the VPN termination units 120 and 210 by utilizing two logically identifiable logical channels, and such logical channels are used in the remote access system relating to the present exemplary embodiment.

Figure 7:
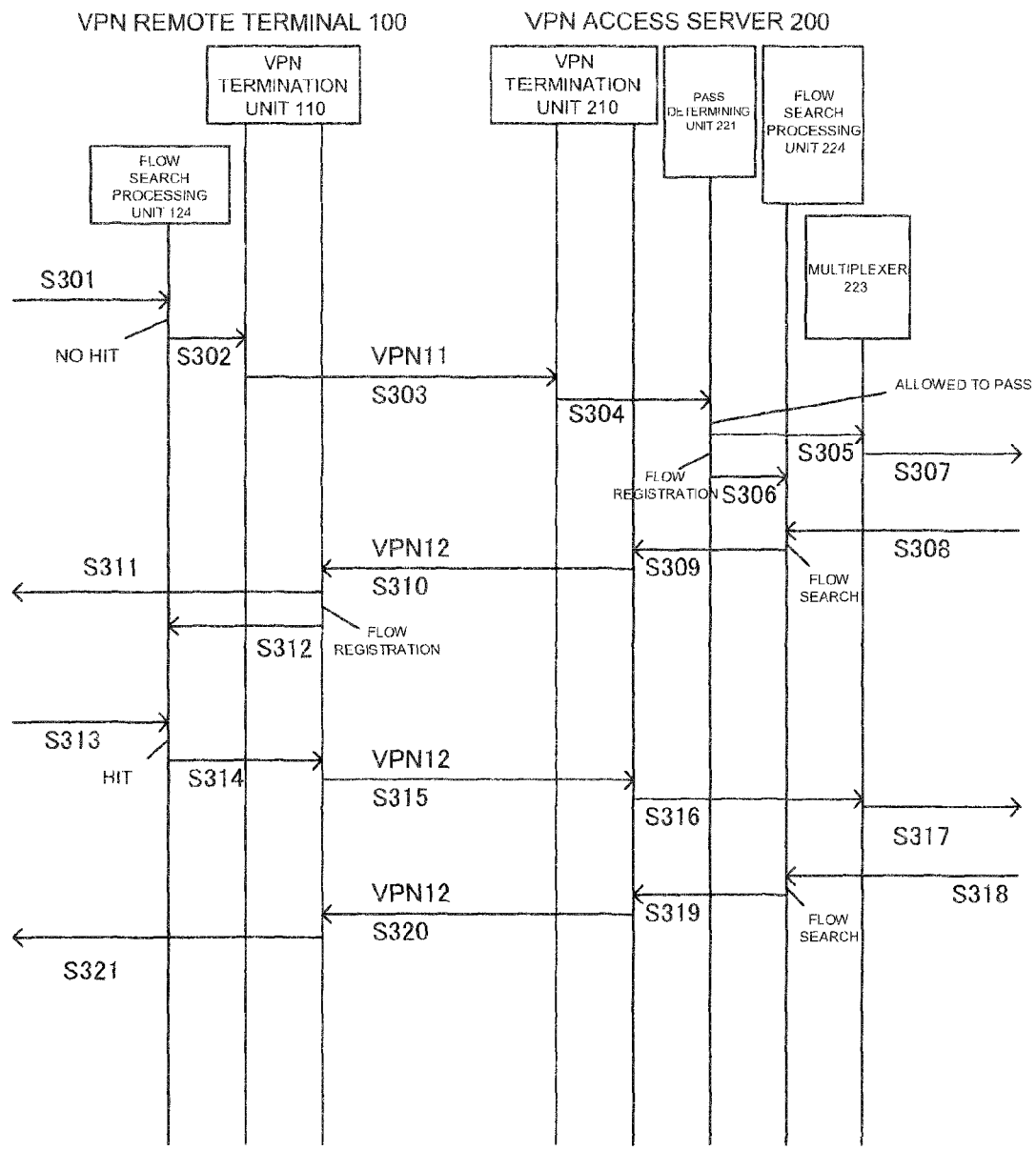
FIG. 7 is a sequence diagram showing the operation of the remote access system relating to an exemplary embodiment.

The operation of the VPN remote terminal 100 and the VPN access server 200 will be described with reference to a sequence diagram in FIG. 7. Here, a case where the application 140 (FIG. 3) on the VPN remote terminal 100 transmits a new flow of data to the server 300 (FIG. 2) via the VPN will be described. At this time, the application 140 hands over the data to the access control unit 120 via the protocol processing unit 130 (S301). First, the flow search processing unit 124 performs a search based on the packet header information. As a result of the search, the flow search processing unit 124 does not get any hits and determines that it is a new flow. Then the flow search processing unit 124 instructs the VPN termination unit 110 to select the VPN 11 (S302). After performing VPN termination processing on the data, the VPN termination unit 110 transmits them to the VPN access server 200 via the VPN 11 (S303). The VPN termination unit 110 adds, for instance, additional information (header) used between the remote terminal 100 and the server 300 to the original LAN packets, encrypts them using IPSec and SSL, further adds an IP address transferable over a public network (such as the Internet), and transmits the data.

The VPN termination unit 210 of the VPN access server 200 terminates the VPN data, extracts the original LAN packets, and transmits them to the pass determining unit 221 (S304). Next, the pass determining unit 221 examines the packets and determines whether or not they are permitted to pass. The pass determining unit 221 makes the determination by referring to the policy table 222 and comparing the packet information (the header and payload) with the conditions for passing registered in the policy table 222. The pass determining unit 221 makes the determination based on, for instance, the source IP address, the destination address, the protocol field (TCP, UDP, etc.), and the layer 4 port number (the destination and source port numbers in the case of TCP). When the pass determining unit 221 determines that the packets are permitted to pass, it transmits them to the multiplexer 223 (S305) and the multiplexer 223 outputs the received packets to the LAN (S307). Further, when the access control tasks are shared with the remote terminal 100 using the method of the present exemplary embodiment, the flow identification information is registered to the flow table 225 (S306).

Next, the operation of the VPN remote terminal 100 and the VPN access server 200 in a case where traffic in the reverse direction is received from the LAN 20 will be described with reference to the drawings. After receiving packets from the LAN 20, the VPN access server 200 has the flow search processing unit 224 perform a flow search (S308). The flow entries have been registered in the flow table 225 in the step S306. As a result, the search by the flow search processing unit 224 provides a hit, and the flow search processing unit 224 selects the VPN 12 (S309). The VPN termination unit 210 capsulates and encrypts the packets, and transmits them to the VPN remote terminal 100 via the VPN 12 (S310). Also refer to FIG. 5.

After receiving the data from the VPN 12, the VPN termination unit 110 of the VPN remote terminal 100 has the flow information extraction unit 121 extract the flow information of the packet header and registers the flow information if the information is unregistered in the flow table 125 (S312). Further, the original packet data taken out as a result of having the VPN termination unit 110 perform VPN termination is handed over to an application via the protocol processing unit 130 (S311).

Next, treatment of packets belonging to the same flow sent from the remote terminal 100 to the VPN access server 200 in this state will be described. Once the VPN remote terminal 100 receives packets sent from the protocol processing unit 130 to the LAN 20 (S313), it has the flow search processing unit 124 provides a flow search. Since the flow has been registered in the step S312, the flow search by the flow search processing unit 124 produces a hit (S314). The flow search hit means that the flow has been permitted to pass by the VPN access server 200 and that it is not necessary for the VPN access server 200 to determine whether or not the flow should be permitted to pass. The flow search processing unit 124 transmits the packets to the VPN termination unit 110 (S314).

The VPN termination unit 110 performs VPN termination processing on the "hit" packets, by capsulating and encoding them, and transmits them to the VPN 12 (S315). This step for UPN 12 differs from the step S303 for UPN 11 described above.

Next, the VPN termination unit 210 of the VPN access server 200 obtains the original packets by capsulating the packets and decoding the encrypted data. Further, the VPN termination unit 210 transmits the data received from the VPN 12 directly to the multiplexer 223 without transmitting them to the pass determining unit 221 (S316). The multiplexer 223 transmits the received packets to the LAN (S317).

Meanwhile processings on data going from the LAN 20 to the remote terminal 100, i.e., steps S318 to S321, are nearly identical to the steps S308 to S311 described above. The only difference is that, since the flow information has already been registered, a new registration is not performed when the flow information extraction unit 121 of the VPN remote terminal 100 consults the flow table 125.

As described, by having the VPN access server 200 and the VPN remote terminal 100 operate together, the tasks of the access control on the packets permitted to pass can be shared by the flow search processing unit 124 and the flow search processing unit 224 while the policy table 222 required for the passage determination stays as put in the VPN access server 200.

Figure 8:
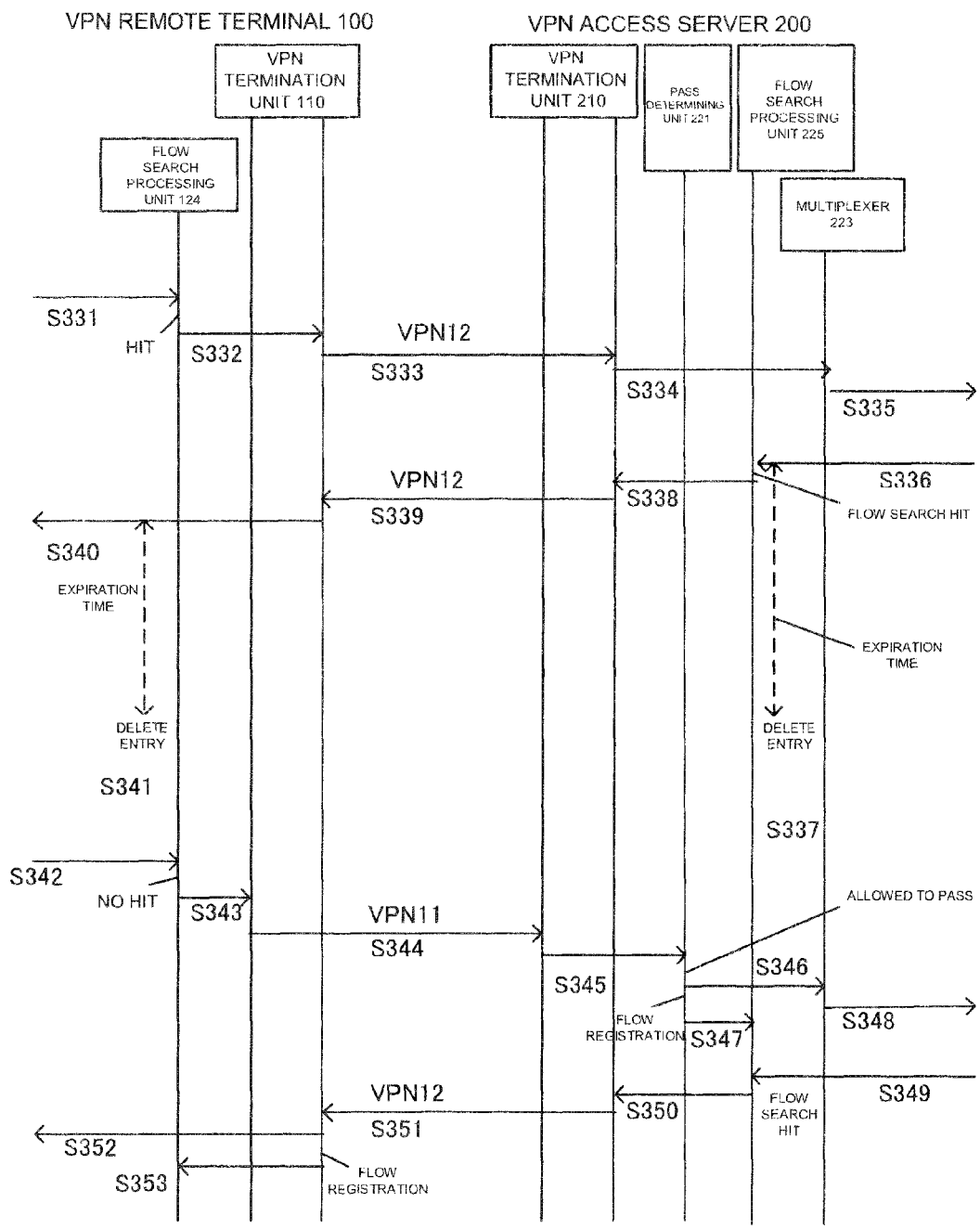
FIG. 8 is a sequence diagram showing the operation of the remote access system relating to an exemplary embodiment.
Figure 10:
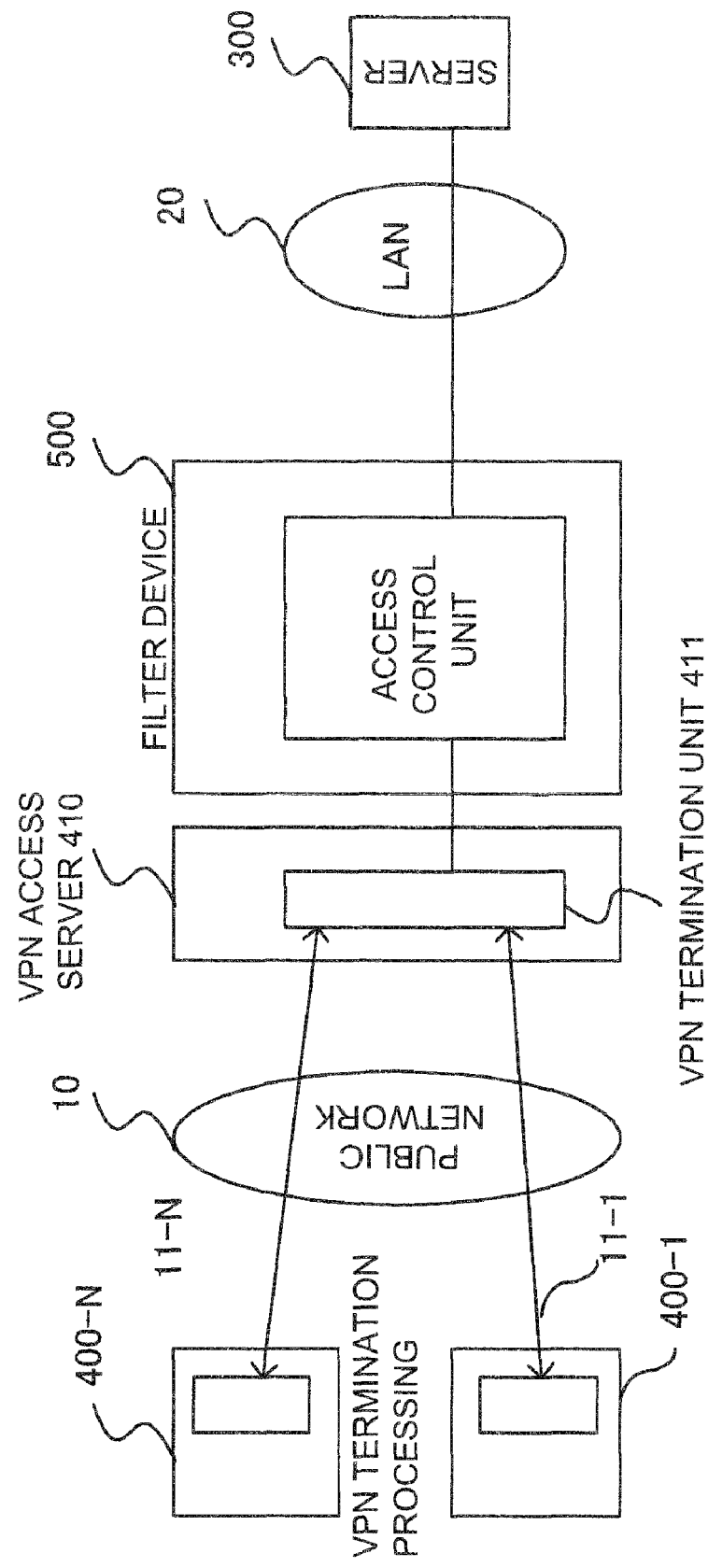
FIG. 10 is a block diagram showing the configuration of an example of a conventional remote access system.

Next, referring to a sequence diagram in FIG. 8, an operation for deleting entries will be described. The sequence diagram in FIG. 8 is a continuation of the sequence diagram in FIG. 7. In other words, we will assume that the flow information has already been registered in the flow table 125. In this state, packets sent from the application 140 of the VPN remote terminal 100 to the LAN 20 are transferred to the LAN 20 by processings identical to the steps S313 to S317 (S331 to S335). On the other hand, packets going to the reverse direction are transferred from the LAN 20 to the VPN remote terminal 100 in a sequence identical to the steps S318 to S321 (S336 to S340).

As an entry in the flow table an expiration time is given, and if no reference is made to an entry until its expiration time, the entry will be deleted from the flow table 125. On the other hand, if an entry was referred to at least once, the expiration time will be renewed. It may be configured so that the VPN access server 200 checks whether or not a flow received is registered in the flow table 125 via the VPN 12. Further, it may be configured so that, when the flow search processing unit 124 gets a hit in a search performed on the traffic sent from the VPN remote terminal 100 to the VPN access server 200, a reference is determined to be made and the expiration time is renewed. When the expiration time has elapsed, the entry of the flow is deleted from the flow table 125 (S341).

When subsequent data belonging to the same flow are received (S342), a search by the flow search processing unit 124 does not produce any hit (NO HIT) (S343) since there is no entry in the flow table 125. In this case, the flow search processing unit 124 select the VPN 11. The flow search processing unit 124 transmits the packets to the channel VPN termination unit 110 (S344). The VPN termination unit 110 capsulates and encrypts the packets, and transmits the result to the VPN access server 200 using the channel VPN 11 (S344).

The VPN termination unlit 210 of the VPN access server 200 transmits the data received via the channel VPN 11 to the pass determining unit 221 (S345). The pass determining unit 221 performs access control and determines whether or not the data are permitted to pass. When the pass determining unit 221 determines that the received flow is permitted to pass and the access control tasks are shared with the remote terminal 100, the pass determining unit 221 registers the flow information to the flow table 225 (S347). Further, via the multiplexer 223 (S346), the pass determining unit 221 transmits the packets to the LAN 20 (S348).

The flow search processing unit 224 receives packets belonging to the same flow going from the LAN 20 to the application 140 of the remote terminal 100 (S349). Since a search on these packets provides a hit from the flow table 225 (S349), the flow search processing unit 224 transmits the packets to the VPN remote terminal 100 via the channel VPN 12 (S350 and S351).

Once the VPN remote terminal 100 receives the packets via the VPN 12, it has the flow information extraction unit 121 extract the flow information and registers it to the flow table 125 (S353). Further, the packets are transferred to the application 140 via the protocol processing unit 130 (S352).

According to the operation described above, the VPN remote terminal 100 is able to perform access control based only on data from the VPN access server 200 without explicitly holding the policy information.

EXAMPLE

A remote access system relating to an example will be described with reference to the drawings. FIG. 9 shows a concrete example of the policy table 222. Referring to the table in FIG. 9, the operation of the remote access system relating to the present example will be described.

The policy table 222 in FIG. 9 shows three entries. References are made to the policy table 222 in order of priority, and a first matched policy is applied. Let's assume that the IP address of the remote terminal is 10.1.1.100 and this terminal requests access to a host with an IP address of 10.1.3.1 via TCP communication with a destination TCP port number of 80 and a source port number of 1234.

Transfer processing will be described with reference to the sequence diagram in FIG. 7. Since a flow search by the flow search processing unit 124 does not produce any hit, the packets are sent to the VPN access server 200 via the VPN 11. The pass determining unit 221 of the VPN access server 200 refers to the policy table 222. At this time, the conditions coincide with the entry with a priority value of 10, and based on the "action" field, the packets are "allowed" to pass.

Once the pass determining unit 221 determines that the packets are "allowed," it registers an entry to the flow table 225 (S306). As shown in the flow table in FIG. 9, an entry is created having key fields such as the IP address 10.1.1.100 of the remote terminal 100, the host IP address 10.1.3.1, the L4 protocol=TCP, the host TCP port number (dport) 80, and the destination port number (sport) 1234. Further, corresponding to these key fields, the VPN 12 is selected as an output and for instance 0:15 as an expiration time is stored.

Further, the packets transferred via the VPN 12 are handed over to the VPN remote terminal 100 and registered to the flow table 125 (S312). When subsequent packets have the same flow information (IPSA=10.1.1.100, IPDA=0.1.3.1, L4 protocol=TCP, destination port=80, and source port=1234), a search by the flow search processing unit 124 produces a hit in the flow table (S313), and the channel VPN 12 is selected. The packets transferred via the VPN 12 are transmitted to the LAN 20 via the VPN termination unit 210 and the multiplexer 223, without passing through the pass determining unit 221.

As described above, high-load processing that determines whether or not data are permitted to pass can be skipped by having the VPN remote terminal 100 and the VPN access server 200, in collaboration, perform the processing on the flows registered in the flow table, and the access performance of the entire system can be improved.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A remote access system comprising: a remote terminal; an access server that accommodates a connection from said remote terminal; and
first and second logical channels that connect said remote terminal and said access server; wherein said remote terminal comprises a flow search processing unit that classifies flows;
said access server comprises a pass determining unit that determines whether or not flows are permitted to pass and a flow search processing unit that classifies the flows;
said first logical channel transfers packets included in a first flow that needs to be judged by said access server as to whether or not the first flow can pass; and
said second logical channel transfers packets included in the first flow that has been permitted by said access server to pass.

2. The remote access system as defined in claim 1, wherein said flow search processing unit in said remote terminal classifies the first flow;
transmits, via said first logical channel, packets included in the first flow that needs to be judged by said access server as to whether or not the first flow can pass to said access server; and
transmits, via said second logical channel, packets included in the first flow that has been permitted by said access server to pass to said access server.

3. The remote access system as defined in claim 1, wherein said access server permits packets received via said second logical channel to pass without determining whether or not they are allowed to pass; and
said pass determining unit in said access server is configured so as to determine whether or not packets received via said first logical channel are permitted to pass and registers information of the first flow, to which the packets belong, to said flow search processing unit in said access server when the packets are permitted to pass.

4. The remote access system as defined in claim 1, wherein said flow search processing unit in said access server classifies the first flow to which packets that must be transmitted to said remote terminal belong;
transmits the packets belonging to the first flow to said remote terminal via said second logical channel when it is not necessary to determine whether or not the flow is permitted to pass; and
transmits the packets to said remote terminal via said first logical channel after said pass determining unit determines whether or not the first flow is permitted to pass when it is necessary to determine whether or not the first flow is permitted to pass.

5. The remote access system as defined in claim 1, wherein flow information referred to by said flow search processing unit in said remote terminal is registered to a flow table provided in said remote terminal based on information of a flow to which packets received via said second logical channel belong.

6. The remote access system as defined in claim 1, wherein flow information referred to by said flow search processing unit in said access server is registered to a flow table provided in said access server when said pass determining unit permits a flow to pass.

7. A remote terminal, wherein its connection is accommodated by an access server and connectable to said access server by first and second logical channels;
   said remote terminal comprising a flow search processing unit that classifies flows, transmits, via said first logical channel, packets included in a first flow that needs to be judged by said access server as to whether or not the first flow can pass to said access server, and transmits, via said second first logical channel, packets included in the first flow that has been permitted by said access server to pass to said access server.

8. An access server, wherein a connection from a remote terminal is accommodated and connectable to said remote terminal by first and second logical channels;
   said access server comprising: a pass determining unit that determines whether or not flows are permitted to pass and a flow search processing unit that classifies the flows; means for receiving, via said first logical channel, packets included in a first flow that needs to be judged by said access server as to whether or not the first flow can pass from said remote terminal and means for receiving, via said second logical channel, packets included in the first flow that has been permitted by said access server to pass to said remote terminal.

9. A remote access method, comprising: having a remote terminal classify a first flow;
   having said remote terminal transmit, via a first logical channel, packets included in the first flow that needs to be judged by an access server as to whether not to the first flow can pass to said access server and transmit, via a second logical channel, packets included in the first flow that has been permitted by said access server to pass to said access server; and
   having said access server permit packets received via said second logical channel to pass without determining whether or not they are allowed to pass;
   wherein said remote terminal and the access server that accommodates a connection from said remote terminal are enabled to remotely access each other.

10. A remote access method, wherein a remote terminal is enabled to remotely access an access server, said remote access method comprising: classifying a first flow; and
   transmitting, via a first logical channel, packets included in the first flow that needs to be judged by said access server as to whether or not the first flow can pass to said access server and transmitting, via a second logical channel, packets included in the first flow that has been permitted by said access server to pass to said access server.

11. A remote access method, wherein an access server is enabled to remotely access a remote terminal; said remote access method comprising:
   transmitting, via a first logical channel, packets included in a first flow that needs to be judged by said access server as to whether or not the first flow can pass to said access server; and permitting packets, received via a second logical channel exclusively for transferring packets included in the first flow that has been permitted by said access server to pass, to pass without determining whether or not they are allowed to pass.

12. A remote access program embodied in a non-transitory medium that has computers provided in a remote terminal and an access server that accommodates a connection from said remote terminal execute remote access processing that enables said remote terminal and said access server to remotely access each other;
   said program having the computer provided in said remote terminal classify a first flow, transmit, via a first logical channel, packets included in the first flow that needs to be judged by said access server as to whether or not the first flow can pass to said access server and transmit, via a second logical channel, packets included in the first flow that has been permitted by said access server to pass to said access server; and
   having the computer provided in said access server permit packets received via said second logical channel to pass without determining whether or not they are allowed to pass.

13. A remote access program embodied in a non-transitory medium that has a computer provided in a remote terminal execute remote access processing that enables said remote terminal to remotely access an access server, said program having the computer provided in said remote terminal perform the method of: classifying a first flow;
   transmitting, via a first logical channel, packets included in the first flow that needs to be judged by said access server as to whether or not the first flow can pass to said access server; and
   transmitting, via a second logical channel, packets included in the first flow that has been permitted by said access server to pass to said access server.

14. A remote access program embodied in a non-transitory medium that has, having a computer provided in an access server execute remote access processing that enables said access server to remotely access a remote terminal;
   said program having the computer provided in said access server perform the method of; judging whether packets in a first flow, received via a first logical channel, can pass to said access server; and
   permitting packets, received via a second logical channel exclusively for transferring packets included in the first flow that has been permitted by said access server to pass, to pass without determining whether or not they are allowed to pass.

* * * * *